Inventor
Albert York

A. YORK.
TRACTOR COUPLING.
APPLICATION FILED JUNE 6, 1919. RENEWED JAN. 21, 1922.

1,427,709.

Patented Aug. 29, 1922.

Inventor.
Albert York.
by Lacey & Lacey,
Attys

UNITED STATES PATENT OFFICE.

ALBERT YORK, OF GARFIELD, KANSAS.

TRACTOR COUPLING.

1,427,709.  Specification of Letters Patent.  Patented Aug. 29, 1922.

Application filed June 6, 1919, Serial No. 302,270. Renewed January 21, 1922. Serial No. 531,006.

*To all whom it may concern:*

Be it known that I, ALBERT YORK, a citizen of the United States, residing at Garfield, in the county of Pawnee and State of Kansas, have invented certain new and useful Improvements in Tractor Couplings, of which the following is a specification.

This invention relates to means for coupling a tractor to a harvesting machine or other implement which may be propelled as a header whereby the axle of the implement may be utilized as the front support for the tractor, thereby reducing the dead weight of the combined machines and permitting one man to perform all the operations needed to control the work. The invention also seeks to so connect the tractor with the implement that the course to be followed by the machine may be easily defined by the operator upon the tractor seat.

These stated objects and other objects which will appear incidentally in the course of the following description are attained in such a mechanism as is illustrated in the accompanying drawings and the invention resides in certain novel features which will be particularly pointed out in the appended claim.

In the drawings—

Figure 1:
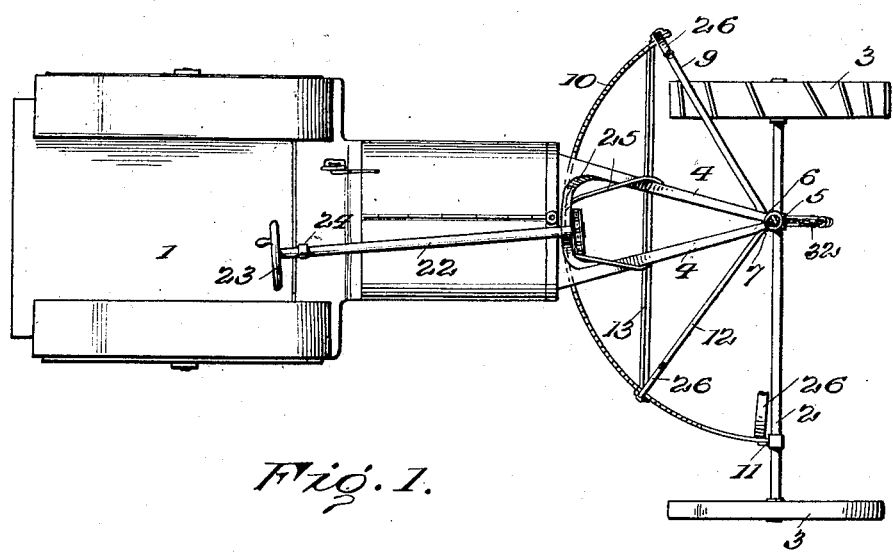
Figure 1 is a plan view partly broken away, of a tractor and the axle of an implement coupled by the use of my improvements.
Figure 2:
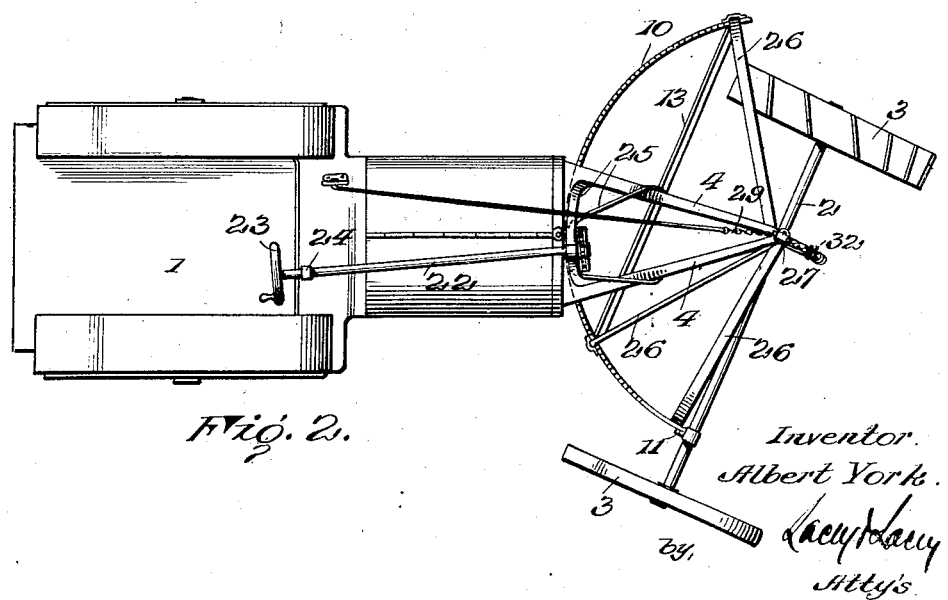
Fig. 2 is a similar view illustrating the relative positions of the tractor and the implement axle when turning to one side.
Figure 3:
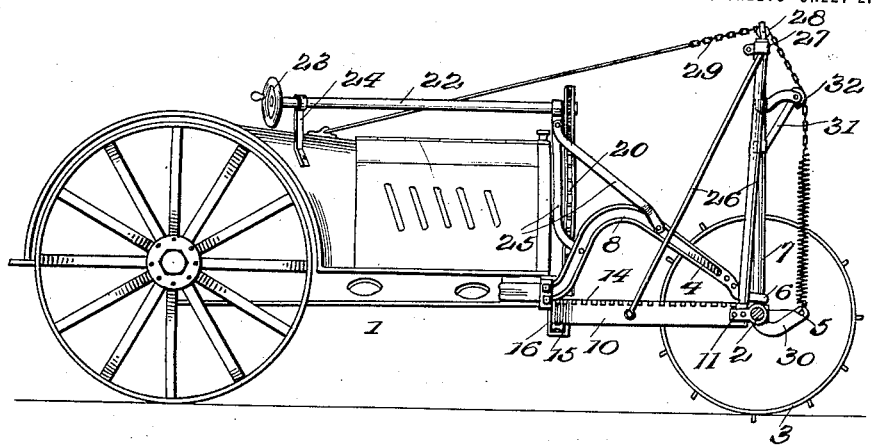
Fig. 3 is a side elevation of the same.
Figure 4:
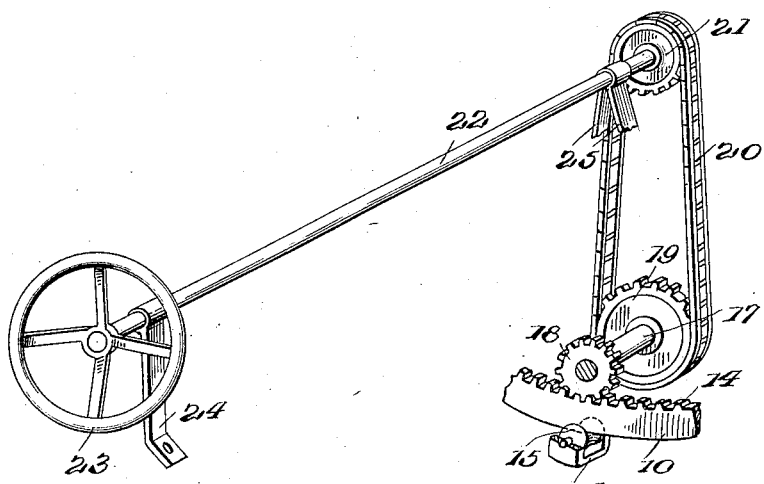
Fig. 4 is a detail of the steering gear.

In the drawings, the reference numeral 1 indicates a tractor which may be of any desired construction and 2 designates the rear axle of any implement, such as a harvesting machine, upon which are mounted ground wheels 3 in the usual manner. In carrying out my invention, I remove the front truck of the tractor and to the front end of the tractor frame or body I secure, in any convenient and practical manner, the rear ends of bars 4 which have their front ends supported upon the axle 2. The said bars 4 are secured rigidly to the tractor at opposite sides of the medial longitudinal plane thereof and converge forwardly to the bracket 5 which is disposed in said plane. The front ends of the bars are merged into or secured to an eye or ring 6 resting on the bracket 5 and fitting pivotally around a post or standard 7 rising from the bracket which is fixed upon the axle 2. The supporting bars are arched, as shown at 8 in Fig. 3, immediately in advance of the tractor, this form being preferred because of its strength. The bracket 5 is located relatively close to the stubbleward ground wheel 3 and a brace 9 extends from the bracket and is secured to the stubbleward end of an arcuate rack 10 which is arranged concentric with the post 7 and has its grassward end secured to the axle 2 by a clip 11. A brace connects the bracket 5 with the rack at such a point of the latter that a chordal brace 13 extending between the braces 9 and 12 is parallel with the axle 2, the rack being thus held rigid and true. The teeth 14 of the rack are on its upper edge while its lower edge is smooth and runs on a roller 15 mounted in a hanger 16 which is secured to and depends from the front end of the tractor. A shaft 17 is journaled in an extends forwardly from a suitable bearing provided therefor on the front end of the tractor and a pinion 18 on the rear end of said shaft meshes with the rack teeth 14. On the front end of the shaft 17 is a sprocket wheel 19 operatively connected by a chain 20 with a sprocket wheel 21 on the front end of a steering rod 22. The said steering rod extends over the top of the tractor and is equipped at its rear end with a hand wheel 23, the rear portion of the rod being journaled in a bearing bracket 24, provided on the tractor, while its forward portion is journaled in a frame 25 secured to and rising from the supporting bars 4.

A plurality of braces 26 extend from the rack to a collar 27 secured on the post 7 to hold said post rigid and a pulley 28 is swiveled on the upper extremity of the post to support and guide a chain or other flexible connection 29 which extends between a crank 30 on the axle and a hand lever (not shown) on the engine platform whereby the harvester mechanism may be raised and lowered. To further guide the connection 29, a bracket 31 is secured on and projects forward from the post 7 and carries a roller 32 over which the chain or cable runs.

It will be readily noted that the front end of the tractor, in the practical use of my invention, is supported upon the axle of the implement and, therefore, will operate as a header to push the implement over the field. The front truck of the tractor being removed, the dead weight of the combined machines is reduced so that the power generated in the engine will be utilized to the fullest extent. The rack and pinion will hold the axle of the implement normally at a right angle to the longitudinal plane of the tractor so that the harvester will travel straight ahead, but if it be desired to turn a corner or otherwise deviate from a straight path the hand wheel 23 is rotated by the operator upon the tractor platform thereby rotating the rod 22 and transmitting motion through the intermediate gearing to the rack 10 which will thereupon move to one or the other side and cause the axle to turn about its pivotal connection with the arms 4. The machine may be backed as easily as it is driven ahead and is, therefore, more practical than horse propelled apparatus and the operator will have a clearer view of the tractor and the implement than he would have if horses were employed as the motive power. The temporary removal of the front truck of the tractor does not affect its efficiency in any way and it may be readily replaced if it be desired to use the tractor for plowing or for transmitting power through a driving belt. On steep grades, the engine or tractor will hold back the implement so that the same will be prevented from running away and the entire apparatus can be handled more easily with non-robust labor than were horses or other draft animals used.

Having thus described the invention, what is claimed as new is:

The combination of a tractor, a supporting guide on the under side of the tractor at the front end thereof, an axle in advance of and transversely to the tractor, a support secured to and extending forwardly from the front end of the tractor and having a pivotal connection with the axle, a rack connected rigidly with and disposed in rear of the axle concentric with said pivotal connection of the support and passing through the supporting guide on the tractor, a steering rod on the side of the tractor, a shaft mounted on the front end of the tractor, a pinion on said shaft meshing with said rack, a sprocket on said shaft, a sprocket on the steering rod, and a chain trained around said sprockets.

In testimony whereof I affix my signature.

ALBERT YORK. [L. S.]